United States Patent
Karino et al.

(10) Patent No.: US 10,050,895 B2
(45) Date of Patent: Aug. 14, 2018

(54) TERMINAL DEVICE, TERMINAL-DEVICE CONTROL METHOD, AND TERMINAL-DEVICE CONTROL PROGRAM

(71) Applicant: NEC Corporation, Tokyo (JP)

(72) Inventors: Shuichi Karino, Tokyo (JP); Yoshinori Saida, Tokyo (JP); Yoshikazu Watanabe, Tokyo (JP); Gen Morita, Tokyo (JP); Takahiro Iihoshi, Tokyo (JP)

(73) Assignee: NEC Corporation, Tokyo (JP)

( * ) Notice: Subject to any disclaimer, the term of this patent is extended or adjusted under 35 U.S.C. 154(b) by 46 days.

(21) Appl. No.: 15/027,673

(22) PCT Filed: Sep. 3, 2014

(86) PCT No.: PCT/JP2014/004519
§ 371 (c)(1),
(2) Date: Apr. 6, 2016

(87) PCT Pub. No.: WO2015/052867
PCT Pub. Date: Apr. 16, 2015

(65) Prior Publication Data
US 2016/0255011 A1    Sep. 1, 2016

(30) Foreign Application Priority Data
Oct. 11, 2013   (JP) ................................ 2013-214025

(51) Int. Cl.
*H04L 12/28* (2006.01)
*H04J 3/00* (2006.01)
(Continued)

(52) U.S. Cl.
CPC .......... *H04L 47/29* (2013.01); *H04L 41/0893* (2013.01); *H04L 69/40* (2013.01);
(Continued)

(58) Field of Classification Search
CPC ... H04L 47/29; H04L 41/0896; H04L 41/142; H04L 41/16; H04L 41/20; H04L 43/04
See application file for complete search history.

(56) References Cited

U.S. PATENT DOCUMENTS 9,055,006 B2 * 6/2015 Chesla .................... H04L 45/74
2006/0159020 A1 * 7/2006 Porat .................. H04L 41/0803
370/235

(Continued)

FOREIGN PATENT DOCUMENTS

| JP | 2008-072496 A | 3/2008 |
| JP | 2011-211433 A | 10/2011 |
| WO | WO-2009/107781 A1 | 9/2009 |

OTHER PUBLICATIONS

International Search Report, Corresponding to PCT/JP2014/004519, dated Nov. 4, 2014, 1 page.

(Continued)

*Primary Examiner* — Faruk Hamza
*Assistant Examiner* — Abu-Sayeed Haque
(74) *Attorney, Agent, or Firm* — Wilmer Cutler Pickering Hale and Dorr LLP

(57) ABSTRACT

Provided is a terminal device capable of recognizing communication traffic in a mobile network for each piece of application software. Communication control means 91 controls packet transfer means for transmitting a packet. Instruction information imparting means 92 imparts instruction information representing an instruction for the communication control means 91 to the communication control means 91. The communication control means 91 acquires statistical information including communication traffic for each flow from the packet transfer means and retains the statistical information along with information on application software which is a flow transmission source and information on an access network used for communication. The instruction (Continued)

information imparting means 92 acquires statistical information of each access network from the communication control means 91 for each piece of application software.

6 Claims, 10 Drawing Sheets

(51) Int. Cl.
*G06F 15/173* (2006.01)
*H04L 12/801* (2013.01)
*H04L 29/14* (2006.01)
*H04L 12/24* (2006.01)
*H04L 12/721* (2013.01)
*H04L 12/937* (2013.01)
*H04L 12/931* (2013.01)

(52) U.S. Cl.
CPC ............ *H04L 45/38* (2013.01); *H04L 49/254* (2013.01); *H04L 49/35* (2013.01)

(56) References Cited

U.S. PATENT DOCUMENTS

| | | | |
|---|---|---|---|
| 2012/0134260 A1* | 5/2012 | Chou | H04L 43/065 370/225 |
| 2012/0207069 A1* | 8/2012 | Xu | H04W 52/0222 370/311 |
| 2013/0163445 A1* | 6/2013 | Majumdar | H04L 43/50 370/252 |
| 2013/0286846 A1* | 10/2013 | Atlas | H04L 45/34 370/236 |
| 2013/0294236 A1* | 11/2013 | Beheshti-Zavareh | H04L 47/22 370/235 |
| 2014/0156777 A1* | 6/2014 | Subbiah | H04L 67/1097 709/213 |
| 2014/0160961 A1* | 6/2014 | Dragulescu | H04L 43/0894 370/252 |
| 2015/0081762 A1* | 3/2015 | Mason | H04L 47/21 709/203 |
| 2015/0103659 A1* | 4/2015 | Iles | H04L 47/11 370/235 |
| 2016/0226742 A1* | 8/2016 | Apathotharanan | H04L 43/12 |

OTHER PUBLICATIONS

Yoshinori Saida, "Septan Gijutsu Kenkyu," NEC Technical Journal, Feb. 2013, vol. 65, No. 3, pp. 105-108, 4 pp.
Iihosi et al. "An OpenFlow-based Scalable Method and its Implementation to Control Traffic on Mobile Terminal," IEICE Technical Report, Mar. 2013, vol. 112, No. 463, pp. 477 to 482, 6 pp.
Openflow.org, "OpenFlow Switch Specification Version 1.0.0 (Wire Protocol 0x01)," Dec. 31, 2009, 42 pp.

* cited by examiner

FIG. 2

| ITEM | FIELD | MEANING |
|---|---|---|
| SEARCH KEY | POLICY ID | POLICY IDENTIFIER |
| | PRIORITY | POLICY PRIORITY |
| | APPLICATION ID | IDENTIFIER OF APPLICATION FOR TRANSMITTING OR RECEIVING TRAFFIC TO BE CONTROLLED IN TERMINAL DEVICE (IF UNSPECIFIED, REGARDED AS WILD CARD) |
| | FLOW IDENTIFICATION INFORMATION | IDENTIFICATION INFORMATION OF FLOW OF TRAFFIC TO BE CONTROLLED (E.G. ADDRESS, PORT NUMBER, ETC.) (IF UNSPECIFIED, REGARDED AS WILD CARD) |
| ACTION | PATH SPECIFICATION | SPECIFICATION OF ACCESS NETWORK TO WHICH TERMINAL DEVICE IS ABLE TO CONNECT |
| | FLAG SPECIFICATION | SPECIFICATION OF FLAGS CORRESPONDING TO VARIOUS OPERATIONS |

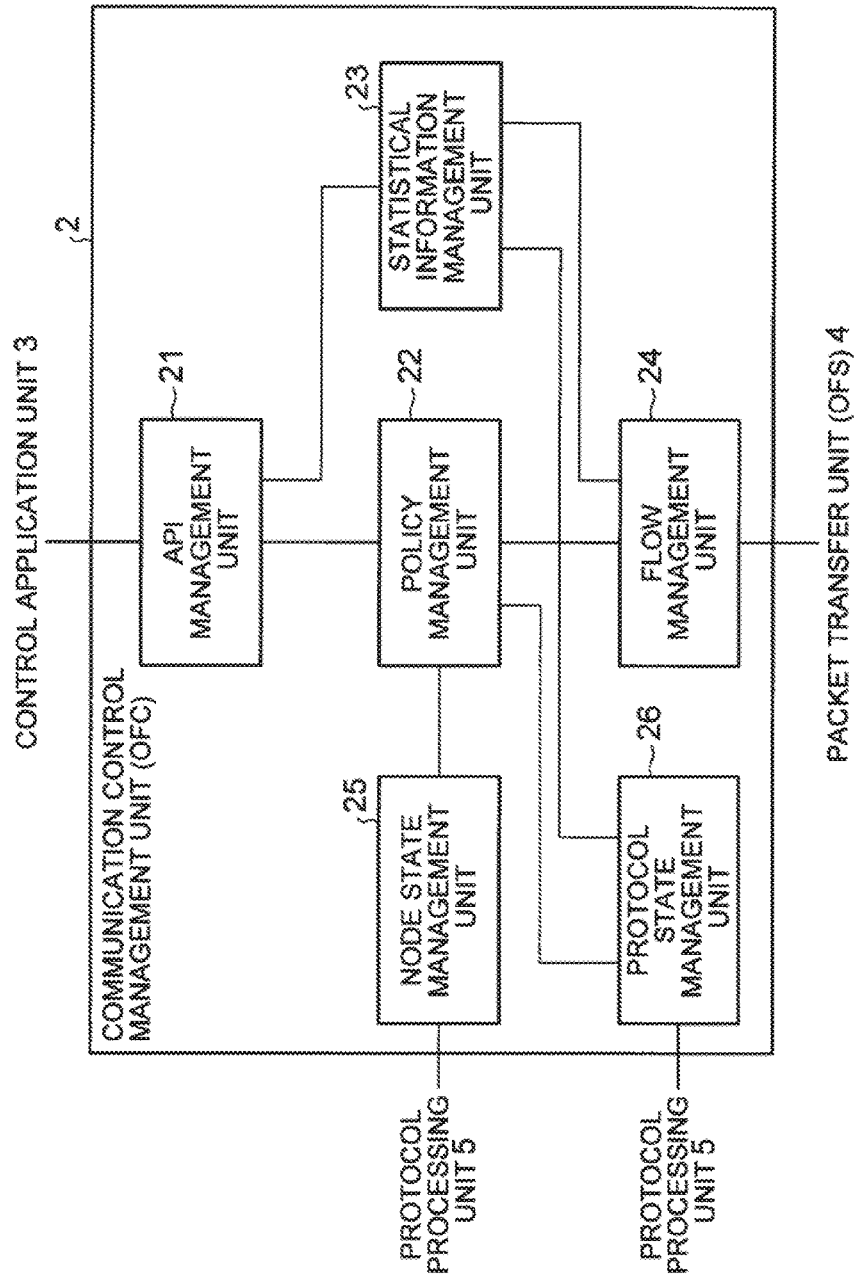

FIG. 4

| ITEM | FIELD | MEANING |
|---|---|---|
| SEARCH KEY | FLOW IDENTIFICATION INFORMATION | IDENTIFICATION INFORMATION OF FLOW OF TRAFFIC TO BE CONTROLLED (E.G. ADDRESS, PORT NUMBER, ETC.) (IF UNSPECIFIED, REGARDED AS WILD CARD) |
| | POLICY ID | POLICY ID USED FOR SETTING FLOW ENTRY |
| VALUE | ACTION | ACTION SET IN FLOW ENTRY |

TERMINAL DEVICE, TERMINAL-DEVICE CONTROL METHOD, AND TERMINAL-DEVICE CONTROL PROGRAM

CROSS-REFERENCE TO RELATED APPLICATIONS

The present application is a national stage application of International Application No. PCT/JP2014/004519 entitled "Terminal Device, Terminal-Device Control Method, and Terminal-Device Control Program," filed on Sep. 3, 2014, which claims the benefit of priority from Japanese Patent Application No. JP2013-214025, filed on Oct. 11, 2013, the disclosures of which are incorporated herein in their entirety by reference thereto.

TECHNICAL FIELD

The present invention relates to a terminal device capable of communicating with the outside, a terminal-device control method for controlling the terminal device, and a terminal-device control program for controlling the terminal device.

BACKGROUND ART

As a protocol by which a control device controls a switch for transferring a packet, there is known OpenFlow. OpenFlow is defined in Non Patent Literature 1.

In OpenFlow, the control device sets a flow entry to the switch. The switch processes the received packet according to the flow entry. The flow entry is information which defines how the packet is to be processed (for example, transfer, disposal, etc.). The flow entry is set for each flow of the packet. When the switch receives the packet and in the case of the presence of a flow entry corresponding to the flow of the packet, the switch processes the packet according to the flow entry. On the other hand, in the case of the absence of the flow entry corresponding to the flow of the received packet, the switch notifies the control device accordingly. The control device decides the flow entry corresponding to the flow of the packet and sets the flow entry to the switch.

In OpenFlow, as examples of messages transmitted or received between the control device and the switch, there are "Packet_in," "Flow_mod," "Packet_out," "Flow_removed," "stats_request," "stats_reply," and the like.

"Packet_in" is a message transmitted from the switch to the control device. "Packet_in" is used to transmit a packet not having a corresponding flow entry from the switch to the control device.

"Flow_mod" is a message transmitted from the control device to the switch. "Flow_mod" is a message for use in performing addition, change, or deletion of the flow entry by the control device to the switch.

"Packet_out" is a message transmitted from the control device to the switch. "Packet_out" is a message of giving an instruction for outputting a packet from a port.

"Flow_removed" is a message transmitted from the switch to the control device. "Flow_removed" is a message for notifying the control device of a fact that the flow entry is not used for a certain time period and is deleted from the switch due to timeout in such a case. When transmitting the "Flow_removed," the switch also transmits the statistical information of a flow corresponding to the deleted flow entry to the control device.

"stats_request" is a message transmitted from the control device to the switch. "stats_request" is a message for requesting the switch to send the statistical information of the flow.

"stats_reply" is a message transmitted from the switch to the control device. "stats_reply" is used to transmit the statistical information of the flow, as a response to "stats_request," from the switch to the control device.

Further, Patent Literature 1 describes a system for measuring application-categorized traffic volume information.

Moreover, Patent Literature 2 describes a wireless communication device for connecting to a plurality of wireless communication networks.

CITATION LIST

Patent Literature

PTL 1: Japanese Patent Application Laid-Open No. 2008-72496 (paragraph 0034)
PTL 2: International Publication No. WO 2009/107781 pamphlet (paragraph 0042)

Non Patent Literature

NPL 1: "OpenFlow Switch Specification Version 1.0.0 (Wire Protocol 0x01)," Dec. 31, 2009, [searched on Sep. 20, 2013], the Internet <http://www.openflow.org/documents/openflow-spec-v1.0.0.pdf>

SUMMARY OF INVENTION

Technical Problem

In recent years, as a terminal device capable of communicating with the outside, smart phones and the like have been widespread rapidly. When the communication traffic in a mobile network (mobile phone communication network) exceeds a predetermined amount, preferably this kind of terminal device is able to perform the control of inhibiting the application software, which is most using the mobile network, to use the mobile network. The terminal device, which is connected at the same time to a plurality of communication networks such as a mobile network and Wi-Fi (Wireless Fidelity, trademark), however, has not been able to recognize the communication traffic of the mobile network for each piece of application software. Therefore, the control as described above has not been able to be implemented.

Therefore, it is an object of the present invention to provide a terminal device, a terminal-device control method, and a terminal-device control program capable of recognizing the communication traffic in a mobile network for each piece of application software.

Solution to Problem

According to the present invention, there is provided a terminal device including: communication control means for controlling packet transfer means for transmitting a packet; and instruction information imparting means for imparting instruction information representing an instruction for the communication control means to the communication control means, wherein the communication control means acquires statistical information including communication traffic for each flow from the packet transfer means and retains the statistical information along with information on application software which is a flow transmission source and information on an access network used for communication; and wherein the instruction information imparting means acquires statistical information of each access network from the communication control means for each piece of application software.

Furthermore, according to the present invention, there is provided a terminal device control method, wherein: communication control means controls packet transfer means for transmitting a packet; instruction information imparting means imparts instruction information representing an instruction for the communication control means to the communication control means; the communication control means acquires statistical information including communication traffic for each flow from the packet transfer means and retains the statistical information along with information on application software which is a flow transmission source and information on an access network used for communication; and the instruction information imparting means acquires statistical information of each access network from the communication control means for each piece of application software.

Furthermore, according to the present invention, there is provided a terminal device control program, which is installed in a computer used as a terminal device, the computer including: communication control means for controlling packet transfer means for transmitting a packet; and instruction information imparting means for imparting instruction information representing an instruction for the communication control means to the communication control means, the program being used for causing the computer to perform: first statistical information acquisition processing in which the communication control means acquires statistical information including communication traffic for each flow from the packet transfer means and retains the statistical information along with information on application software which is a flow transmission source and information on an access network used for communication; and second statistical information acquisition processing in which the instruction information imparting means acquires statistical information of each access network from the communication control means for each piece of application software.

Advantageous Effects of Invention

According to the present invention, it is possible to recognize the communication traffic of a mobile network for each piece of application software.

BRIEF DESCRIPTION OF DRAWINGS

FIG. 2 is an explanatory diagram schematically illustrating a policy.
FIG. 3 is a block diagram illustrating the details of an OFC.
FIG. 4 is a schematic diagram illustrating an example of information managed by a flow management unit.

DESCRIPTION OF EMBODIMENT

Hereinafter, an exemplary embodiment of the present invention will be described with reference to the accompanying drawings. In the description below, a control device in OpenFlow is referred to as "OFC (OpenFlow controller)." In addition, a switch in OpenFlow is referred to as "OFS (OpenFlow switch)."

Figure 1:
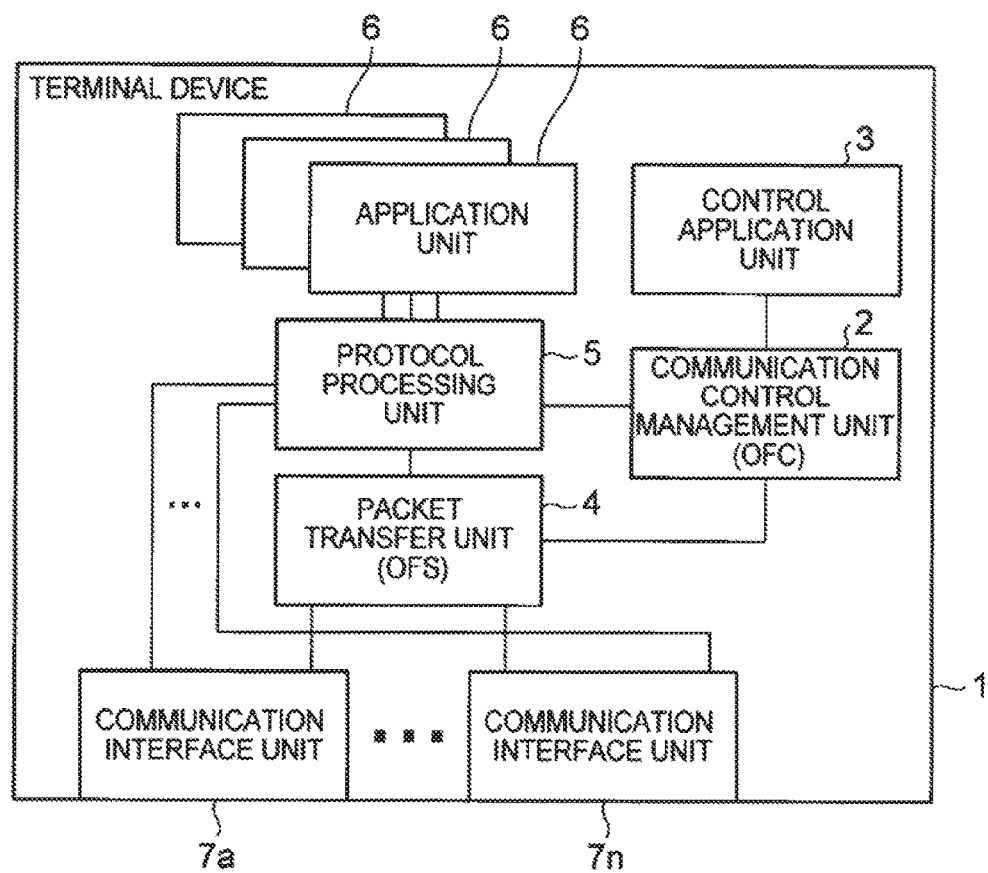
FIG. 1 is a block diagram illustrating an example of a terminal device of the present invention.

FIG. 1 is a block diagram illustrating an example of a terminal device of the present invention. The terminal device 1 of the present invention is, for example, a smart phone or a tablet-type terminal device, but is not limited thereto. Furthermore, the terminal device 1 of the present invention is able to be connected to a plurality of access networks (communication network) at the same time. The terminal device 1 of the present invention includes a communication control management unit 2, a control application unit 3, a packet transfer unit 4, a protocol processing unit 5, an application unit 6, and communication interface units 7a to 7n.

Each application unit 6 is implemented by a CPU operating according to each piece of application software (hereinafter, simply referred to as "application") which has been installed in the terminal device 1. Each application unit 6 performs an operation according to the corresponding application.

The packet transfer unit 4 processes (for example, transfers, discards, etc.) a packet to be transmitted to the outside by the application unit 6 in accordance with the communication control management unit 2.

The communication control management unit 2 controls the packet processing in the packet transfer unit 4 on the basis of an instruction from the control application unit 3. In this exemplary embodiment, description will be made by giving an example of a case where the communication control management unit 2 controls the packet transfer unit 4 in accordance with OpenFlow. In other words, this exemplary embodiment will be described assuming that the communication control management unit 2 corresponds to the OFC in OpenFlow and that the packet transfer unit 4 corresponds to the OFS in OpenFlow. The communication control management unit 2, however, may control the packet transfer unit 4 in a non-OpenFlow protocol. Hereinafter, the communication control management unit 2 will be referred to as "OFC 2." In addition, the packet transfer unit 4 will be referred to as "OFS 4." The OFC 2 and the OFS 4 are implemented by a CPU operating according to a program. The program for implementing a function as the OFC 2 is referred to as "OFC base."

The control application unit 3 is implemented by a CPU operating according to control application software. Hereinafter, the control application software will be referred to as "control application." The control application unit 3 transmits instruction information representing an instruction for the OFC 2 to the OFC 2. The instruction information is referred to as "policy."

The communication interface units 7a to 7n are communication interfaces corresponding to various types of communication such as a mobile network, Wi-Fi (Wireless Fidelity, trademark), and the like. Each of the communication interface units 7a to 7n is specifically identified as a port of the OFS 2.

The protocol processing unit 5 is implemented by a CPU operating according to a program. The protocol processing unit 5 provides an application with communication services. The protocol processing unit 5 is a portion in which a protocol such as a transmission control protocol (TCP), a user datagram protocol (UDP), or the like used in a transmission path is installed. The protocol processing unit 5 monitors whether or not the respective communication interface units 7a to 7n are ready to be used and notifies the OFC 2 (specifically, a node state management unit 25 described later: see FIG. 3) of the monitoring result. In addition, the protocol processing unit 5 notifies the OFC 2 (specifically, a protocol state management unit 26 described later: see FIG. 3) of an own port number and a process ID (identification) corresponding to the own port number. The above own port number is the own port number of the TCP, UDP, or the like in each communication that has been designated by the application.

Programs for implementing the functions of the control application, the OFC 2, the OFS 4, and the protocol processing unit 5 may be referred to as "terminal-device control programs." The terminal-device control programs are stored in a storage device (not illustrated) of the terminal device 1. The CPU of the terminal device 1 reads the terminal-device control programs. According to the programs, the CPU operate as the OFC 2, the control application unit 3, the OFS 4, and the protocol processing unit 5.

The following describes the policy transmitted from the control application unit 3 to the OFC 2. The policy is instruction information for giving an instruction of an action corresponding to the content of traffic. FIG. 2 is an explanatory diagram schematically illustrating a policy. The policy includes a search key to be used for searching for the policy and an action representing an operation specified by the policy.

The information for specifying traffic is described as a search key. For example, an application ID is described, for example, as a search key. The application ID is an identifier of an application for transmitting or receiving traffic to be controlled within the terminal device. If the application ID is unspecified in the policy, it is regarded as a wild card.

Moreover, for example, the identification information of the flow of the traffic to be controlled may be described as a search key. The identification information of the flow includes, for example, an address, a port number, and the like. If the address or the port number to be used as flow information is unspecified, it is regarded as a wild card.

Furthermore, the search key may include a priority. If there is a plurality of policies corresponding to common traffic, the priority represents the priority order of each policy. Therefore, if the OFC 2 obtains a plurality of policies as a result of searching for policies corresponding to certain traffic, the OFC 2 finally considers only the policy having the highest priority among the policies as a search result.

Moreover, the search key includes a policy ID which is an identifier of the policy.

As a mode of specifying an action, there is a mode of specifying a path of traffic according to the traffic. In this mode, an access network to which the terminal device is connectable (Wi-Fi, a mobile network, etc.) is specified. For example, if Wi-Fi is specified as an action in a policy corresponding to certain traffic, the packet of the traffic is to be transmitted from the communication interface unit corresponding to the Wi-Fi.

Further, as a mode for specifying an action, there is a mode of determining whether or not to perform a predefined operation according to a flag. As an example of the predefined operation, there is, for example, an operation such that, if the OFC 2 detects a new flow satisfying the condition specified in the policy, the OFC 2 notifies the control application unit 3 of the application and destination of a transmission source of the new flow. It is assumed that the flag corresponding to the operation is set on in the policy. In the case of having detected new traffic (more specifically, a new flow satisfying the specified condition) and having searched for the policy as a policy corresponding to the traffic, the OFC 2 performs the above operation specified by the flag. In addition, if the flag is set off in the policy, the OFC 2 does not perform the above operation even if the policy is searched for.

Note that a plurality of actions may be described in the policy.

Furthermore, the application corresponding to the application unit 6 which has transmitted a packet to the OFS 4 is referred to as "application of the transmission source of the packet."

In the present invention, the OFC 2 acquires the statistical information for each flow from the OFS 4. In this case, the OFC 2 transmits "stats_request" of OpenFlow to the OFS 4 and the OFS 4 transmits "stats_reply" to the OFS 2, by which the OFC 2 acquires the statistical information. Then, the OFC 2 retains the statistical information in each access network for each application. Furthermore, the control application unit 3 makes a request to the OFC 2 for the statistical information of each specified access network for each application and the OFC 2 transmits the requested statistical information to the control application unit 3. Moreover, if the total sum of the communication traffic (for example, the number of bytes) in a mobile network is equal to or greater than a threshold value, the control application unit 3 identifies an application whose communication traffic is the maximum among the applications which are performing communication in the mobile network. The control application unit 3 creates a policy for specifying a network other than the mobile network (in this example, Wi-Fi) as a path for use in the communication of the application and then transmits the policy to the OFC 2. The operation of the control application unit 3 for the OFC 2 and the operation of the OFC 2 for the control application unit 3 as described above are features of the present invention. In other words, a Northbound application programming interface (API) between the control application unit 3 and the OFC 2 is a feature of the present invention. With the features of the present invention described above, it is possible to obtain an advantageous effect that the terminal device 1 is able to recognize the communication traffic in a mobile network for each application. Furthermore, with respect to the application whose communication traffic in the mobile network is the maximum, the terminal device 1 is able to switch an access network to be used from the mobile network to Wi-Fi advantageously. As a result, it is possible to suppress the communication load on the mobile network.

FIG. 3 is a block diagram illustrating the details of the OFC 2. The OFC 2 includes an API management unit 21, a policy management unit 22, a statistical information management unit 23, a flow management unit 24, a node state management unit 25, and a protocol state management unit 26.

The API management unit 21 relays an API call from the control application unit 3 and a response from the OFC 2 side. For example, in the case of receiving a notification of addition, change, or deletion of a policy from the control application unit 3, the API management unit 21 transmits the notification to the policy management unit 22. Further, when the policy management unit 22 transmits information to the control application unit 3, the API management unit 21 relays the information. Furthermore, for example, in the case of receiving a request for the statistical information of the traffic from the control application unit 3, the API management unit 21 transmits the request to the statistical information management unit 23. In addition, when the statistical information management unit 23 transmits the statistical information in response to the request to the control application unit 3, the API management unit 21 relays the statistical information.

The policy management unit 22 retains each policy transmitted from the control application unit 3.

Moreover, in the case of acquiring a packet transmitted to the OFC 2 along with "Packet_in" from the OFS 4 (a packet for which no coincident flow entry is present in the OFS 4), the policy management unit 22 searches for a policy corresponding to the packet and performs an operation defined by the policy searched for. More specifically, upon receiving the packet transmitted to the OFC 2 along with "Packet_in" from the OFS 4, the flow management unit 24 transmits the packet to the policy management unit 22 to request a policy search. In the following description, the operation will be referred to as "policy_inquiry" in some cases. The policy management unit 22 searches for the policy in response to the request and performs the operation defined by the policy searched for. In this process, if an action for specifying an access network is described in the policy obtained as the search result, the policy management unit 22 gives an instruction of creating a flow entry for the flow management unit 24 by sending back the action and the policy ID to the flow management unit 24.

The statistical information management unit 23 retains the statistical information transmitted from the OFS 4. Specifically, the statistical information management unit 23 retains the statistical information in each access network for each application. Furthermore, upon receiving a request for the statistical information from the control application unit 3 via the API management unit 21, the statistical information management unit 23 transmits the requested statistical information to the control application unit 3.

The flow management unit 24 performs communication with the OFS 4 and manages information on the flow entry set in the OFS 4. Upon receiving a packet (a packet for which no coincident flow entry is present in the OFS 4) along with "Packet_in" from the OFS 4, the flow management unit 24 transmits the packet to the policy management unit 22 to request a policy search. In the case of receiving an action and a policy ID for specifying an access network from the policy management unit 22 as a response to the request, the flow management unit 24 creates a flow entry on the basis of the action and the flow information of the above packet and transmits the flow entry to the OFS 4. Then, the flow management unit 24 manages the information on the flow entry.

FIG. 4 is a schematic diagram illustrating an example of information managed by the flow management unit 24. The flow management unit 24 creates and retains information illustrated in FIG. 4 for each flow entry. Furthermore, each piece of information managed by the flow management unit 24 contains a search key for searching for the each piece of information. The identification information of the flow of the traffic controlled by the flow entry is described in the search key. As has been described, the identification information of the flow includes, for example, an address, a port number, and the like. If the address or port number to be the flow information is unspecified, it is regarded as a wild card. Furthermore, the search key includes a policy ID used when setting the flow entry. Moreover, an action set in the flow entry is also described in each piece of information managed by the flow management unit 24.

Furthermore, in the case of receiving "Flow_removed," the flow management unit 24 transmits the statistical information received from the OFS 4 along with "Flow_removed" to the statistical information management unit 23. As illustrated in FIG. 4, the flow entry and the policy ID are associated with each other. Therefore, even if the statistical information of the deleted flow is transmitted from the OFS 4, the statistical information management unit 23 is able to recognize to which application the statistical information corresponds.

In addition, the flow management unit 24 acquires the statistical information for each flow from the OFS 4 also by periodically transmitting "stats_request" to the OFS 4 on the basis of an instruction periodically given from the statistical information management unit 23. Also in this case, the flow management unit 24 transmits the statistical information to the statistical information management unit 23.

When acquiring the statistical information of the flow, the flow management unit 24 identifies the policy ID (see FIG. 4) retained in association with the flow entry of the flow. Then, the flow management unit 24 inquires the application ID described as a search key in the policy indicated by the policy ID from the policy management unit 22 (specifically, a policy search unit 223 described later: see FIG. 5) and acquires the application ID from the policy management unit 22. Moreover, the flow management unit 24 determines to which access network the statistical information corresponds on the basis of the identification information of the flow. As a result, the flow management unit 24 is able to associate the application ID, the access network, and the statistical information with each other. Then, the flow management unit 24 causes the statistical information management unit 23 to retain the statistical information in association with the application ID and the access network.

The node state management unit 25 acquires information, which indicates whether or not the respective communication interface units 7*a* to 7*n* (see FIG. 1) are ready to be used, from the protocol processing unit 5 and retains the information. The policy management unit 22 (specifically, an action selection unit 224 described later: see FIG. 5) determines whether or not the individual communication interface units 7*a* to 7*n* are available by referring to the information. In the case where the communication interface unit which is going to send a packet is unavailable, the policy management unit 22 (specifically, an action selection unit 224) does not send an action for specifying an access network corresponding to the communication interface unit to the flow management unit 24 even if the action is described in the policy searched for. As a result, the flow entry for sending out a packet from the unavailable communication interface unit is not created.

The protocol state management unit 26 retains information representing a correspondence relation between the flow information of a packet and an application ID (an identifier of an application) of the transmission source application of the packet. This example will be described by giving an example of a case where an own port number is used as the flow information of the packet. The protocol state management unit 26 acquires the own port number and a process ID from the protocol processing unit 5 (see FIG. 1). The protocol state management unit 26 creates information in which a user ID (UID) corresponding to the process ID is associated with the application ID corresponding to the UID and then retains the information. As a result, the flow information (own port number) is associated with the application ID, thereby enabling a search for the application ID based on the flow information. It should be noted, however, that the mode where the protocol state management unit 26 retains the information representing the correspondence relation between the flow information and the application ID is not particularly limited, but the above mode need not be used necessarily.

Figure 5:
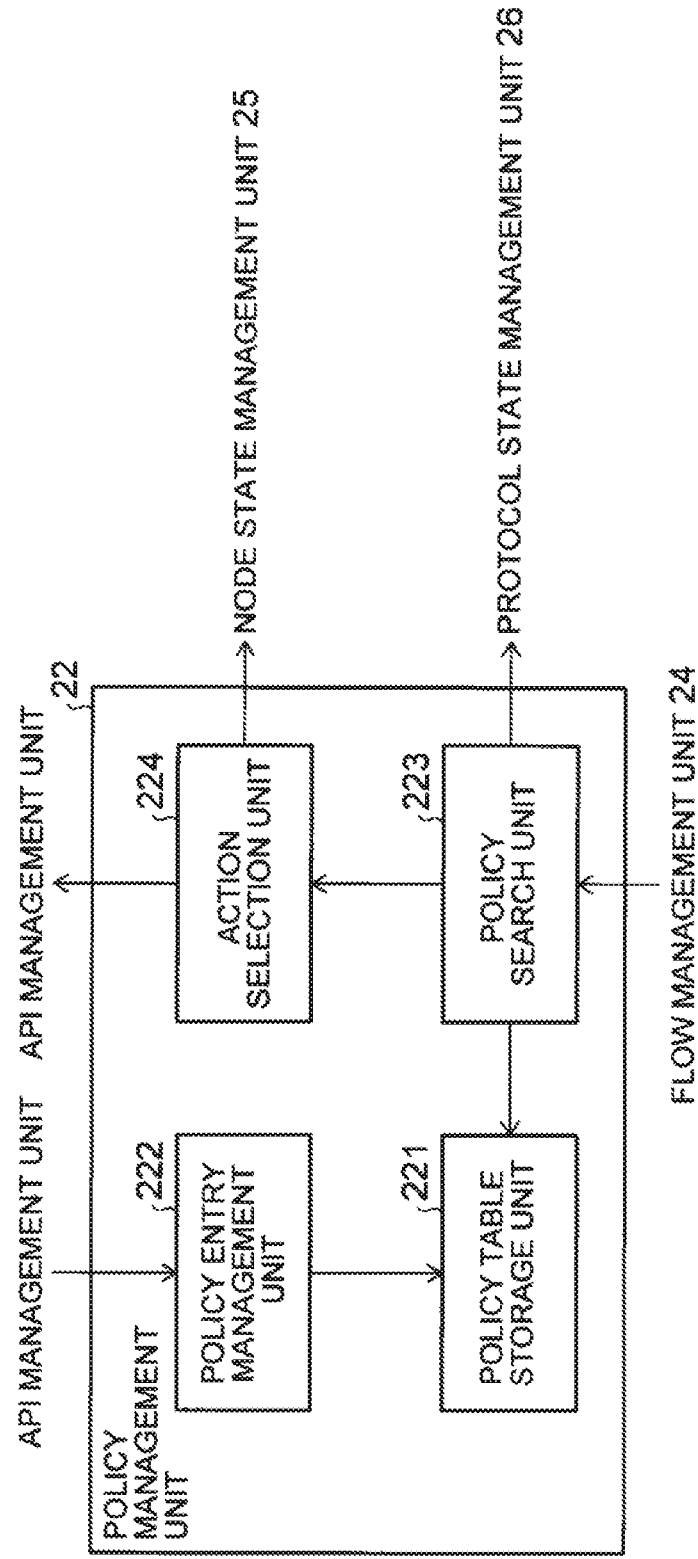
FIG. 5 is a block diagram illustrating the details of a policy management unit.

FIG. 5 is a block diagram illustrating the details of the policy management unit 22. The policy management unit 22 includes a policy table storage unit 221, a policy entry management unit 222, a policy search unit 223, and an action selection unit 224.

The policy table storage unit 221 is a storage device (for example, a memory) for storing a policy.

Upon receiving a notification of addition, change, or deletion of the policy from the control application unit 3 via the API management unit 21, the policy entry management unit 222 updates the policy in the policy table storage unit 221 according to the notification. For example, the policy entry management unit 222 causes the policy table storage unit 221 to store a new policy, changes the content of the policy stored in the policy table storage unit 221, or deletes the policy stored in the policy table storage unit 221.

Upon receiving a packet from the flow management unit 24, the policy search unit 223 causes the protocol state management unit 26 to search for the application ID corresponding to the flow information with the flow information (in this example, a port number) of the packet as a key. The protocol state management unit 26 sends back the application ID searched for to the policy search unit 223. The application ID is an application ID which acted as the transmission source of the packet. The policy search unit 223 searches for the policy from the policy table storage unit 221 with the flow information of the packet transmitted from the application ID and the flow management unit 24 as a key.

The action selection unit 224 selects an action defined by the policy having been searched for by the policy search unit 223. For example, if an action of performing the flow detection notification is defined in the policy searched for by the policy search unit 223, the action selection unit 224 performs the flow detection notification for the control application unit 3. Moreover, for example, if an action of specifying an access network is described in the policy, the action selection unit 224 gives an instruction of creating a flow entry to the flow management unit 24 by sending back the action and the policy ID to the flow management unit 24.

Figure 6:
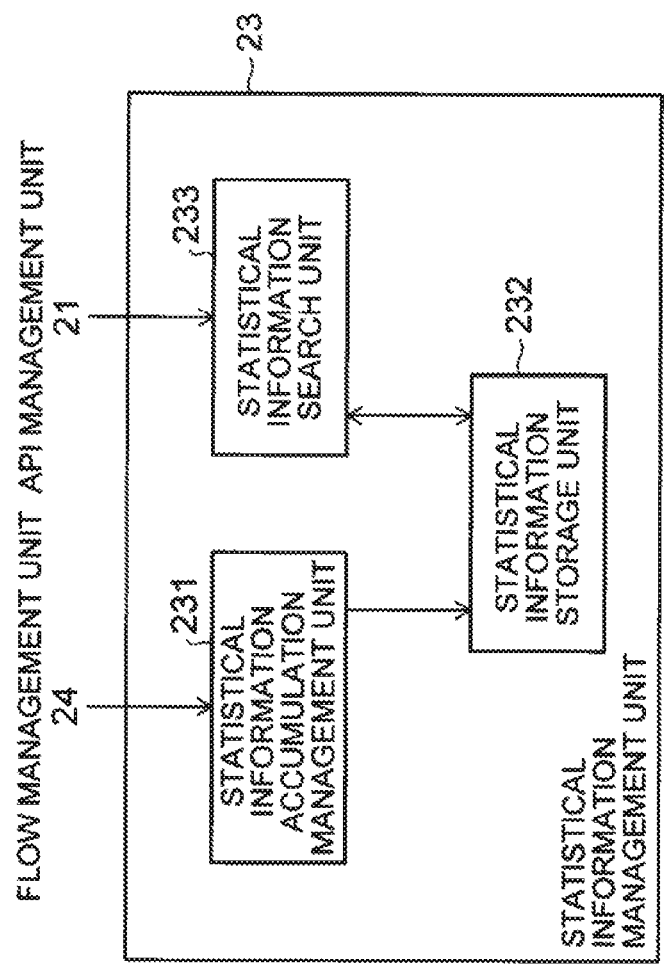
FIG. 6 is a block diagram illustrating the details of a statistical information management unit.

FIG. 6 is a block diagram illustrating the details of the statistical information management unit 23. The statistical information management unit 23 includes a statistical information accumulation management unit 231, a statistical information storage unit 232, and a statistical information search unit 233.

The statistical information storage unit 232 is a storage device (for example, a memory) which stores statistical information.

The statistical information accumulation management unit 231 updates statistical information stored in the statistical information storage unit 232 on the basis of statistical information acquired periodically from the OFS 4 by the flow management unit 24 or statistical information acquired along with "Flow_removed" by the flow management unit 24 due to the deletion of the flow entry in the OFS 4. More specifically, the statistical information accumulation management unit 231 is given information on the application ID and access network corresponding to the statistical information along with the statistical information by the flow management unit 24 and updates the statistical information corresponding to the application ID and access network in the statistical information storage unit 232.

The statistical information search unit 233 receives a request for statistical information via the API management unit 21 from the control application unit 3. The statistical information search unit 233 searches the statistical information storage unit 232 for the requested statistical information. Then, the statistical information search unit 233 transmits the statistical information to the control application unit 3 via the API management unit 21.

Figure 7:
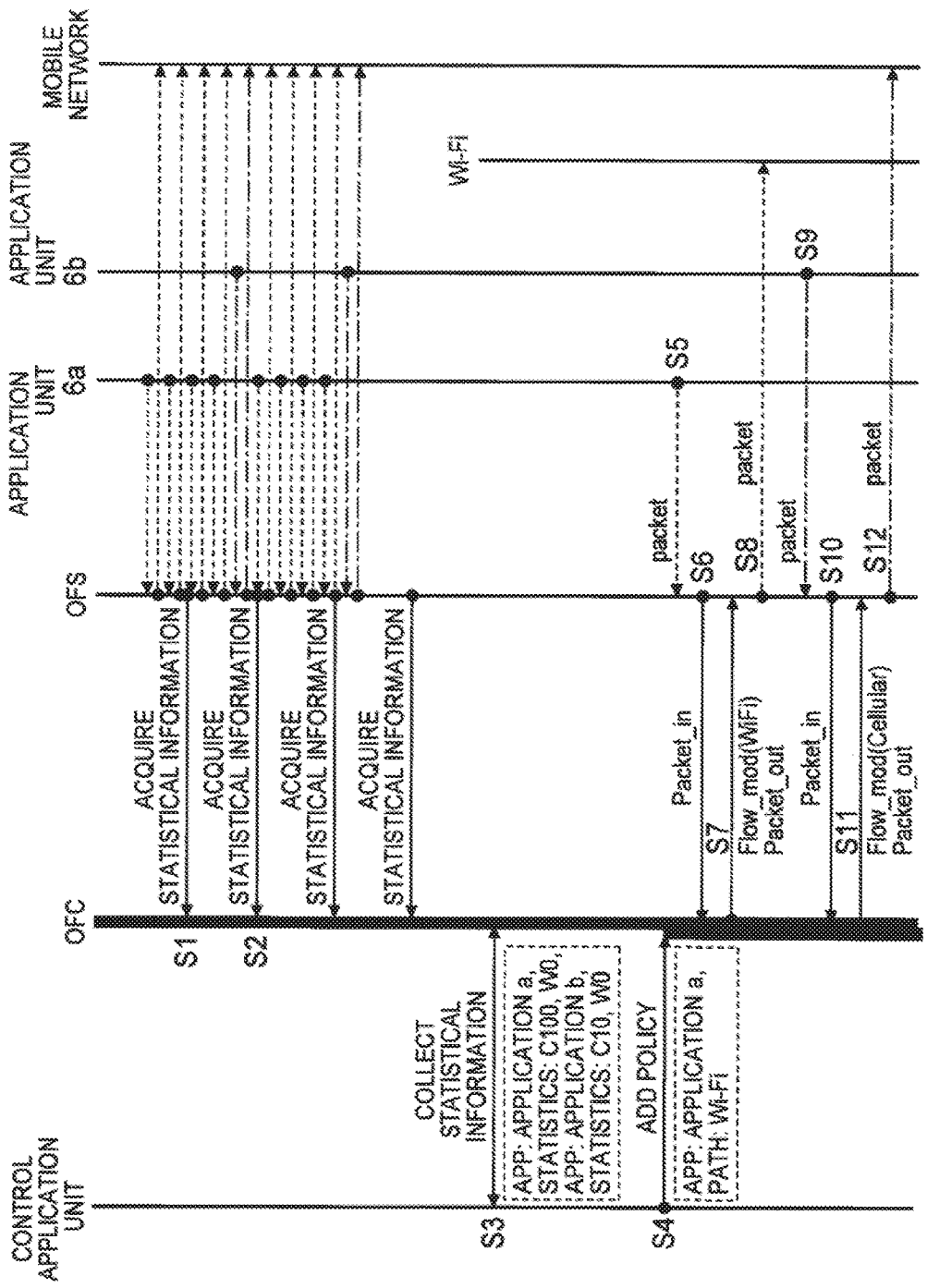
FIG. 7 is a sequence diagram illustrating an example of the progress of processing of the present invention.

Subsequently, the operation of the present invention will be described. FIG. 7 is a sequence diagram illustrating an example of the progress of processing of the present invention. In FIG. 7, it is assumed that "APP" means an application. Furthermore, in FIG. 7, the content of the policy transmitted to the OFC 2 by the control application unit 3 and the content of the statistical information collected from the OFC 2 by the control the application unit 3 are each enclosed by a dashed line in the diagram. Moreover, an application corresponding to an application unit 6a is indicated by a symbol a. An application corresponding to an application unit 6b is indicated by a symbol b. In FIG. 7, the transfer path of a packet transferred in the order of the application unit 6a, the OFS 4, and the mobile network is indicated by a dashed line. Moreover, the transfer path of a packet transferred in the order of the application unit 6b, the OFS 4, and the mobile network is indicated by an alternate long and short dash line. Although the following description will be made by giving an example of applications a and b, the number of types of applications is not limited to two.

Moreover, the terminal device 1 is connected to a plurality of access networks. In the present exemplary embodiment, the terminal device 1 is assumed to be connected to two access networks of the mobile network and Wi-Fi. Although there are long term evolution (LTE), 3rd generation (3G), and the like as mobile networks, the exemplary embodiment will be described by giving an example of a case of using a particular mobile network (for example, LTE) as a mobile network. It should be noted, however, that LTE is illustrative only as a mobile network and 3G may be used as a mobile network.

Although not illustrated in FIG. 7, the control application unit 3 supplies the OFC 2 with a policy of giving an instruction to use a mobile network by default with respect to a flow in which the application a or b is a transmission source. Specifically, first, the control application unit 3 describes the application ID of the application a as a search key and supplies the OFC 2 with a policy in which a mobile network is described as a path in an action. Similarly, the control application unit 3 describes the application ID of the application b as a search key and supplies the OFC 2 with a policy in which a mobile network is described as a path in an action. These policies are referred to as "default policies."

When the OFS 4 receives a packet in which the application a is a transmission source, first, there is no flow entry corresponding to the packet. Therefore, the OFS 4 transmits the packet by using "Packet_in" to the OFC 2. The OFC 2 creates a flow entry which defines that a packet is transmitted from the communication interface unit corresponding to the mobile network with respect to the flow of the packet on the basis of the default policy corresponding to the application a. In this process, the flow management unit 24 (see FIG. 3) in the OFC 2 retains information including a policy ID, as illustrated in FIG. 4, as information related to the flow entry. Then, the OFC 2 sets the flow entry in the OFS 4.

As a result, when receiving a packet where the application a is a transmission source, the OFS 4 transmits the packet from the communication interface unit corresponding to the mobile network (see the dashed line illustrated in the upper part of FIG. 7).

Similarly, when the OFS 4 receives a packet where the application b is a transmission source at the beginning, a flow entry corresponding to the packet does not exist. Therefore, the OFS 4 transmits the packet to the OFC 2 by using "Packet_in." The OFC 2 creates a flow entry which defines that the packet is transmitted from the communication interface unit corresponding to the mobile network with respect to the flow of the packet on the basis of the default policy corresponding to the application b. The flow management unit 24 (see FIG. 3) retains information including a policy ID, as illustrated in FIG. 4, as information related to the flow entry. Then, the OFC 2 sets the flow entry in the OFS 4.

As a result, when receiving a packet where the application b is a transmission source, the OFS 4 transmits the packet from the communication interface unit corresponding to the mobile network (see the alternate long and short dash line illustrated in the upper part of FIG. 7).

After the setting of the flow entry, the OFS 4 retains statistical information for each flow entry. In this specification, it is assumed that the OFS 4 retains at least information on the communication traffic as statistical information. The information on the communication traffic may be represented by, for example, the number of bytes or may be represented by the number of packets. The OFS 4 may include also information other than communication traffic as the statistical information. The OFS 4 accumulates communication traffic each time when performing communication of a packet coincident with the flow entry and retains statistical information including information on the communication traffic.

The OFC 2, for example, makes a request to the OFS 4 for the statistical information of each flow periodically and acquires the statistical information from the OFS 4 (steps S1, S2, and the like).

Upon acquiring the statistical information of each flow, the flow management unit 24 (see FIG. 3) in the OFC 2 performs processing described below for each flow. The flow management unit 24 identifies the policy ID (see FIG. 4) corresponding to the flow entry. Then, the flow management unit 24 inquires the application ID described as a search key in the policy corresponding to the policy ID from the policy search unit 223 in the policy management unit 22. Moreover, the flow management unit 24 determines to which access network the statistical information corresponds on the basis of the identification information of the flow. Then, the flow management unit 24 causes the statistical information management unit 23 (see FIG. 3) to store the statistical information in association with the application ID and the access network.

Furthermore, the control application unit 3 collects the statistical information retained in the statistical information management unit 23 in the OFC 2 as described above (step S3). The control application unit 3 makes a request to the OFC 2 for the statistical information in each specified access network for each application and collects the statistical information in each access network for each application. In this example, it is assumed that the control application unit 3 specifies Wi-Fi and a mobile network for each application and collects the statistical information of the Wi-Fi and mobile network. In the example illustrated in FIG. 7, "C" represents a mobile network and "W" represents Wi-Fi. Therefore, in the example illustrated in FIG. 7, the control application unit 3 collects information (C100, W0) that the communication traffic in the mobile network is 100 and the communication traffic in Wi-Fi is 0, with respect to the application a, from the OFC 2. Similarly, the control application unit 3 collects information (C10, W0) that the communication traffic in the mobile network is 10 and the communication traffic in the Wi-Fi network is 0 with respect to the application b from the OFC 2.

The control application unit 3 calculates the total sum of the communication traffic in the mobile network on the basis of the statistical information collected in step S3 and determines whether the total sum is equal to or greater than a threshold value. The threshold value is predetermined.

If the total sum of the communication amount in the mobile network is less than the threshold value, the control application unit 3 does not perform the addition of a new policy.

On the other hand, if the total sum of the communication traffic in the mobile network is equal to or greater than the threshold value, the control application unit 3 instructs the OFC 2 to add a new policy. In the example illustrated in FIG. 7, the total sum of the communication traffic in the mobile network is 110 (100+10=110). The description will be made assuming that this value is equal to or greater than the threshold value. The control application unit 3 identifies an application whose communication traffic in the mobile network is the maximum among the applications performing communication in the mobile network. In the example illustrated in FIG. 7, the communication traffic in the mobile network used by the application a is 100 (C100). Moreover, the communication traffic in the mobile network used by the application b is 10 (C10). Therefore, the control application unit 3 identifies the application a. Then, the control application unit 3 creates a policy in which the application ID of the application a is described in the search key and a network (in this example, Wi-Fi) other than the mobile network is described as a path in the action. The control application unit 3 sets the priority of the policy so as to be higher than the priority of the default policy. Then, the control application unit 3 instructs the OFC 2 to add the policy (step S4). The OFC 2 retains the policy in accordance with the instruction of the control application unit 3.

Moreover, it is assumed that the packet transmission from the application units 6a and 6b stops and that the OFS 4 deletes each flow entry due to timeout.

It is assumed that thereafter the application unit 6a resumes the packet transmission and then transmits the first packet to the OFS 4 after the resumption (step S5). At this time, in the OFS 4, the flow entry corresponding to the flow of the packet has already been deleted. Therefore, the OFS 4 transmits the packet to the OFC 2 by using "Packet_in" (step S6).

The transmission source of the packet received by the OFC 2 in step S6 is the application a. The OFC 2 searches for the policy acquired in step S4 as a policy corresponding to the flow information of the packet. Then, the OFC 2 creates a flow entry on the basis of the policy. Specifically, the OFC 2 creates a flow entry which defines that the packet is transmitted from the Wi-Fi communication interface unit with respect to the flow of the packet received from the OFS 4 along with "Packet_in" in step S6 and transmits the flow entry to the OFS 4 (step S7). Then, the OFS 4 stores the flow entry. In step S7, the OFC 2 specifically transmits "Flow_mod(Wi-Fi)" and "Packet_out" to the OFS 4.

The OFS 4 transmits the packet received from the application unit 6a from the Wi-Fi communication interface unit in accordance with the flow entry (step S8).

Moreover, it is assumed that the application unit 6b also resumes the packet transmission and then transmits the first packet to the OFS 4 after the resumption (step S9). At this time, in the OFS 4, the flow entry corresponding to the flow of the packet has already been deleted. Therefore, the OFS 4 transmits the packet to the OFC 2 by using "Packet_in" (step S10).

The transmission source of the packet received by the OFC 2 in step S10 is the application b. The OFC 2 searches for the default policy in which the application b is a search key as a policy corresponding to the flow information of the packet. Then, the OFC 2 creates a flow entry on the basis of the default policy. Specifically, the OFC 2 creates a flow entry which defines that the packet is transmitted from the communication interface unit of the mobile network with respect to the flow of the packet received from the OFS 4 along with "Packet_in" in step S10 and transmits the flow entry to the OFS 4 (step S11). Then, the OFS 4 stores the flow entry. In step S11, the OFC 2 specifically transmits "Flow_mod(Cellular)" and "Packet_out" to the OFS 4. The above "Cellular" means a mobile network.

The OFS 4 transmits the packet received from the application unit 6b from the communication interface unit of the mobile network in accordance with the flow entry (step S12).

In the above progress of the processing, the execution timing of the operation (Step S3) in which the control application unit 3 collects statistical information from the OFC 2 is not particularly limited. For example, the control application unit 3 may periodically collect statistical information from the OFC 2.

With the above operation, the application a whose communication traffic in the mobile network is high is switched so as to perform communication using Wi-Fi, thereby reducing the communication load on the mobile network.

Figure 8:
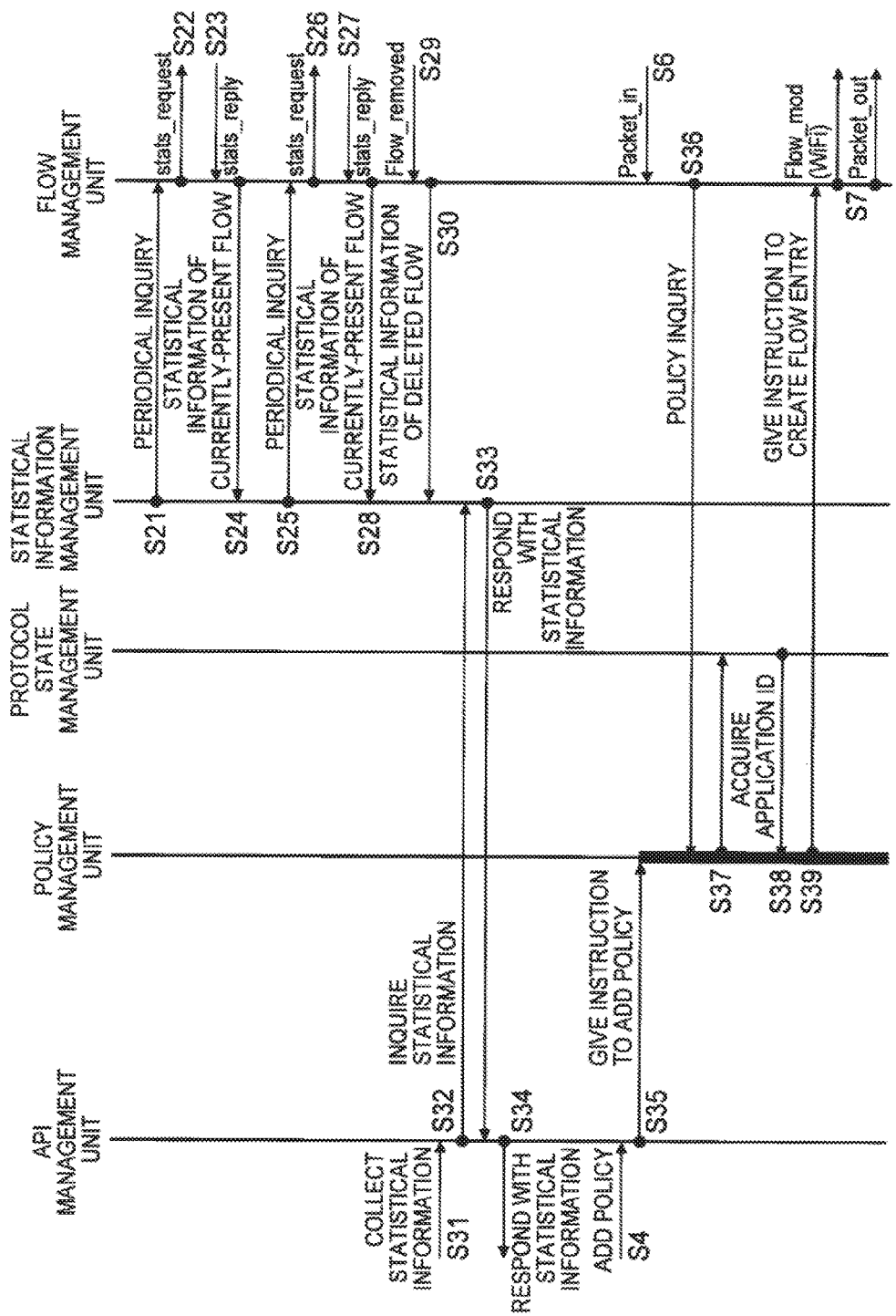
FIG. 8 is a sequence diagram illustrating an example of the progress of processing of the OFC.

FIG. 8 is a sequence diagram illustrating an example of the progress of processing of the OFC 2. Hereinafter, the progress of processing of the OFC 2 in the operation illustrated in FIG. 7 will be described with reference to FIGS. 8, 3, and the like.

The statistical information management unit 23 (see FIG. 3) in the OFC 2 periodically instructs the flow management unit 24 to acquire the statistical information of each flow from the OFS 4 (step S21). The flow management unit 24 requests the statistical information of each flow by transmitting "stats_request" to the OFS 4 on the basis of the instruction (step S22).

The OFS 4 sends back the statistical information of the flow along with "stats_reply" to the flow management unit 24 in response to "stats_request" (step S23). The statistical information of an individual flow includes information on the communication traffic of the flow which has been accumulated in the OFS 4 until the execution of step S23.

Upon acquiring the statistical information of each flow in step S23, the flow management unit 24 determines to which access network the statistical information corresponds on the basis of the identification information of the flow for each flow. Moreover, the flow management unit 24 identifies a policy ID (see FIG. 4) retained in association with the flow entry. Then, the flow management unit 24 inquires the application ID described as a search key in the policy indicated by the policy ID from the policy search unit 223 (see FIG. 5) in the policy management unit 22 and acquires the application ID from the policy search unit 223. In this process, the policy search unit 223 reads the policy identified by the policy ID from the policy table storage unit 221 and sends back the application ID described as a search key in the policy to the flow management unit 24. Thereafter, the flow management unit 24 associates the statistical information acquired for each flow with the application ID and the access network.

Furthermore, the flow management unit 24 transmits the combination information including the statistical information, an application ID, and an access network to the statistical information management unit 23 (step S24). The statistical information management unit 23 updates the statistical information retained in the statistical information management unit 23 on the basis of the above information. Specifically, the statistical information management unit 23 overwrites the statistical information corresponding to the application ID and the access network with the statistical information acquired anew in the statistical information storage unit 232 (see FIG. 6).

Since the statistical information management unit 23 periodically repeats the instruction (the instruction to the flow management unit 24), a series of operations of steps S21 to S24 is repeated periodically. In the example illustrated in FIG. 8, the operations of steps S25 to S28 are the same as those of steps S21 to S24.

Furthermore, in the case of having detected a flow entry which has not been used for a certain time period or more, the OFS 4 deletes the flow entry and transmits the statistical information of the flow corresponding to the flow entry along with "Flow_removed" to the OFC 2. The statistical information includes information on the communication traffic of the flow which has been accumulated in the OFS 4 until the deletion of the flow. In the OFC 2, the flow management unit 24 receives the statistical information of the flow along with "Flow_removed" (step S29). Also in this case, the flow management unit 24 associates the statistical information with the application ID and the access network. This operation is the same as in acquiring the statistical information in step S23. Furthermore, the flow management unit 24 transmits the combination information including the statistical information, the application ID, and the access network to the statistical information management unit 23 (step S30). The statistical information management unit 23 updates the statistical information retained in the statistical information management unit 23 on the basis of the above information. Specifically, the statistical information management unit 23 overwrites the statistical information corresponding to the application ID and the access network with statistical information acquired anew in the statistical information storage unit 232 (see FIG. 6).

Furthermore, the control application unit 3 makes a request to the OFC 2 for the statistical information in each specified access network for each application (step S31). Then, the API management unit 21 in the OFC 2 receives the request. Thereupon, the API management unit 21 makes a request to the statistical information management unit 23 for the statistical information in each access network specified by the control application unit 3 for each application (step S32).

Thereupon, the statistical information management unit 23 sends back the statistical information in each access network for each application to the API management unit 21 in response to the request (step S33). Then, the API management unit 21 transmits the statistical information to the control application unit 3 (step S34). As a result, the control application unit 3 acquires statistical information in each access network for each application.

The operations of steps S31 to S34 correspond to the operation of step S3 illustrated in FIG. 7.

The operation of the control application unit 3 after step S34 is the same as the operation of the control application unit 3 after step S3. More specifically, the control application unit 3 calculates the total sum of the communication traffic in the mobile network on the basis of the statistical information in each access network for each application acquired in step S34 and determines whether or not the total sum is equal to or greater than the threshold value. If the total sum of the communication traffic in the mobile network is less than the threshold value, the control application unit 3 does not add a new policy. Furthermore, if the total sum of the communication traffic in the mobile network is equal to or greater than the threshold value, the control application unit 3 instructs the OFC 2 to add a new policy. In this specification, the description will be made by giving an example of adding a policy in which the application ID of the application a is described as a search key and Wi-Fi is described as a path in the action, as has been described with reference to FIG. 7. The control application unit 3 sets the priority of the policy so as to be higher than the priority of the default policy. The control application unit 3 creates the policy and instructs the OFC 2 to add the policy. The instruction of adding the policy corresponds to step S4 illustrated in FIG. 7.

In the OFC 2, the API management unit 21 receives the instruction of adding the policy from the control application unit 3 and instructs the policy management unit 22 to add the policy (step S35). Thereupon, in the policy management unit 22, the policy entry management unit 222 (see FIG. 5) receives the instruction of adding the policy and causes the policy table storage unit 221 to store the policy.

Moreover, as has been described in the description of FIG. 7, it is assumed that the OFS 4 deleted each flow entry due to timeout.

If the OFS 4 transmits "Packet_in" in step S6 (see FIG. 7), the flow management unit 24 receives this "Packet_in." As a result, the flow management unit 24 also receives a packet for which the corresponding flow entry is absent in the OFS 4. The flow management unit 24 transmits this packet to the policy management unit 22 and requests a search for a policy corresponding to the packet (step S36).

The policy management unit 22 instructs the protocol state management unit 26 to search for the application ID corresponding to the packet acquired in step S36 on the basis of the flow information of the packet (step S37). The policy management unit 22 then acquires the application ID obtained as a result of the search from the protocol state management unit 26 (step S38). The application ID represents an application of the transmission source of the packet. The policy management unit 22 searches for the policy by using the application ID and the like. As a result, the policy management unit 22 acquires the policy added by the instruction in step S4. The policy management unit 22 transmits a path (in this example, Wi-Fi) described as an action in the policy and the policy ID of the policy to the flow management unit 24 and instructs the flow management unit 24 to create a flow entry (step S39).

Hereinafter, the operations of steps S37 to S39 will be described in more detail.

In the policy management unit 22, the policy search unit 223 (see FIG. 5) receives a request (policy inquiry) of step S36. Thereupon, the policy search unit 223 instructs the protocol state management unit 26 to search for the application ID corresponding to the packet acquired in step S36 on the basis of the flow information of the packet (step S37). In this example, it is assumed that the policy search unit 223 uses an own port number as a key out of the flow information.

As has been described, the protocol state management unit 26 retains the flow information of the packet and the application ID of the transmission source application of the packet. For example, the protocol state management unit 26 retains the correspondence relation between the own port number included in the packet, the process ID, the UID, and the application ID. Upon receiving a search instruction from the policy search unit 223, the protocol state management unit 26 searches for the application ID corresponding to the own port number and notifies the policy search unit 223. As a result, the policy search unit 223 in the policy management unit 22 acquires the application ID of the application a which is the transmission source of the packet (step S38).

The policy search unit 223 searches for the policy stored in the policy table storage unit 221 with the application ID and the flow information of the packet acquired in step S36 as a search key. Thereupon, the policy added by the instruction in step S4 is obtained. Although there is a default policy including the application a as a search key, the priority of the policy added by the instruction in step S4 is higher than the default policy. Therefore, the policy search unit 223 considers the policy added by the instruction in step S4 as a search result.

The policy search unit 223 instructs the action selection unit 224 to select the action of the policy searched for. The action selection unit 224 selects an action in the policy according to the instruction. In this policy, an action of specifying Wi-Fi as an access network is described. Therefore, the action selection unit 224 transmits the action and the policy ID of the policy to the flow management unit 24 and instructs the flow management unit 24 to create the flow entry (step S39).

The flow management unit 24 creates a flow entry which defines that the packet is transmitted from the Wi-Fi communication interface unit with respect to the flow of the packet received from the OFS 4 along with "Packet_in" in step S6. Then, the flow management unit 24 instructs the OFS 4 to set the flow entry. This operation corresponds to step S7 illustrated in FIG. 7. At this time point, the flow management unit 24 transmits "Flow_mod(Wi-Fi)" and "Packet_out" to the OFS 4.

Figure 9:
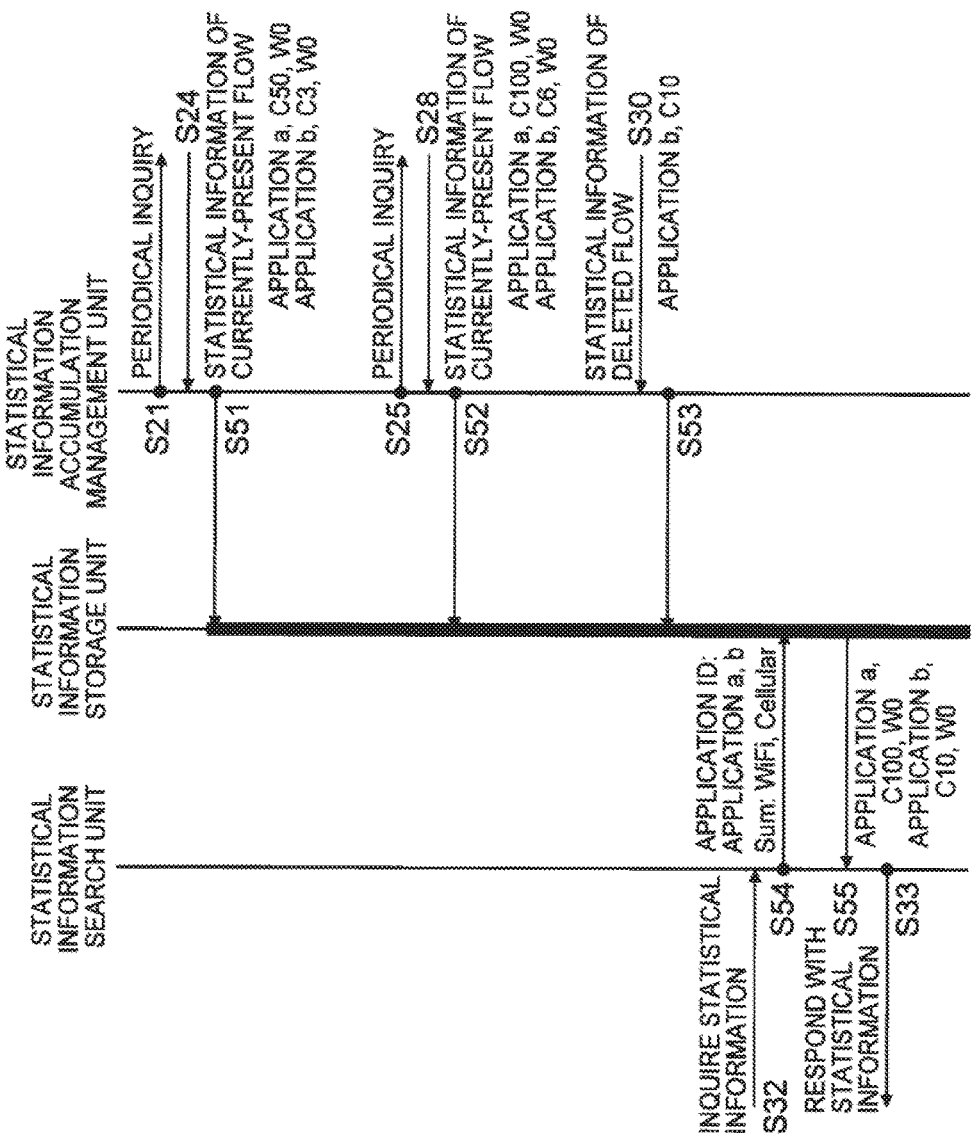
FIG. 9 is a sequence diagram illustrating an example of the progress of processing of the statistical information management unit.

FIG. 9 is a sequence diagram illustrating an example of the progress of processing of the statistical information management unit 23. The following describes the progress of processing of the statistical information management unit 23 in the operation illustrated in FIG. 8 with reference to FIGS. 9 and 6 and the like.

In step S21 (see FIGS. 8 and 9), the statistical information accumulation management unit 231 instructs the flow management unit 24 to acquire the statistical information of each flow from the OFS 4. The flow management unit 24 acquires the statistical information of each flow from the OFS 4 in accordance with the instruction. The flow management unit 24 associates the application ID, the access network, and the statistical information with each other and transmits the information to the statistical information management unit 23 (step S24: see FIGS. 8 and 9). The statistical information accumulation management unit 231 acquires the information.

Also in FIG. 9 similarly to FIG. 7, "C" represents a mobile network and "W" represents Wi-Fi. In step S24 illustrated in FIG. 9, the statistical information accumulation management unit 231 acquires "50" as the communication traffic corresponding to the application a and the mobile network (C) and acquires "0" as the communication traffic corresponding to the application a and Wi-Fi (W). Furthermore, the statistical information accumulation management unit 231 acquires "3" as the communication traffic corresponding to the application b and the mobile network (C) and acquires "0" as the communication traffic corresponding to the application b and Wi-Fi (W).

The statistical information accumulation management unit 231 overwrites the statistical information (specifically, the communication traffic) stored in the statistical information storage unit 232 with the information of the communication traffic acquired in step S24 (step S51). For example, the statistical information accumulation management unit 231 overwrites the communication traffic corresponding to the application a and the mobile network (C) with "50."

Since the statistical information management unit 23 periodically repeats the instruction (the instruction to the flow management unit 24) of step S21, the series of operations of steps S21, S24, and S51 are periodically repeated. In the example illustrated in FIG. 9, the operations of steps S25, S28, and S52 are the same as those of the operations of steps S21, S24, and S51.

Note that, however, the passage of time causes an increase in the communication traffic in the mobile network in the OFS 4. This thereby increases the communication traffic related to the mobile network, where the communication traffic is acquired by the statistical information management unit 23 in step S28. In step S28 illustrated in FIG. 9, the statistical information accumulation management unit 231 acquires "100" as the communication traffic corresponding to the application a and the mobile network (C) and acquires "0" as the communication traffic corresponding to the application a and Wi-Fi (W). Moreover, the statistical information accumulation management unit 231 acquires "6" as the communication traffic corresponding to the application b and the mobile network (C) and acquires "0" as the communication traffic corresponding to the application b and Wi-Fi (W).

Moreover, also when the flow management unit 24 receives the communication traffic of the deleted flow along with "Flow_removed" in connection with the deletion of the flow entry in the OFS 4, the flow management unit 24 associates the application ID, the access network, and the statistical information thereof with each other and transmits the information to the statistical information management unit 23 (step S30: see FIGS. 8 and 9). The statistical information accumulation management unit 231 acquires the information.

In step S30 illustrated in FIG. 9, the statistical information accumulation management unit 231 acquires "10" as the communication traffic corresponding to the application b and the mobile network (C).

The statistical information accumulation management unit 231 overwrites the statistical information (communication traffic in this specification) stored in the statistical information storage unit 232 with the information on the communication traffic acquired in step S30 (step S53). In this example, the statistical information accumulation management unit 231 overwrites the communication traffic corresponding to the application b and the mobile network (C) with "10."

Furthermore, the control application unit 3 makes a request to the OFC 2 for the statistical information (specifically, the communication traffic) in each specified access network for each application (see step S31 illustrated in FIG. 8). Thereupon, the API management unit 21 receives the request and the API management unit 21 makes a request to the statistical information search unit 233 for the communication traffic in each access network specified by the control application unit 3 for each application (step S32). In this example, the control application unit 3 requests the communication traffic of Wi-Fi and the mobile network, with respect to each of the applications a and b. The API management unit 21 then makes a request to the statistical information search unit 233 for the communication traffic of Wi-Fi and the mobile network with respect to each of the applications a and b in step S32.

The statistical information search unit 233 searches for each requested amount of communication traffic among all amounts of communication traffic stored in the statistical information storage unit 232 (step S54) and reads the communication traffic searched for from the statistical information storage unit 232 (step S55). In this example, the statistical information search unit 233 reads "100" as the communication traffic corresponding to the application a and the mobile network and reads "0" as the communication traffic corresponding to the application a and Wi-Fi. Moreover, the statistical information search unit 233 reads "10" as the communication traffic corresponding to the application b and the mobile network and reads "0" as the communication traffic corresponding to the application b and Wi-Fi.

The statistical information search unit 233 transmits the information on the communication traffic read in step S55 along with the information on the application and the access network, as a response to step S32, to the API management unit 21. This operation corresponds to step S33 illustrated in FIG. 8. Then, the API management unit 21 transmits the information on each amount of communication traffic along with the information on the application and the access network to the control application unit 3.

According to this exemplary embodiment, the OFC 2 acquires the statistical information for each flow from the OFS 4 and retains the statistical information in association with the application, which is the flow transmission source, and the access network. Then, the control application unit 3 makes a request to the OFC 2 for the statistical information in each specified access network for each application and acquires the statistical information from the OFC 2. Therefore, in this example, it is possible to recognize the communication traffic in each access network for each application. Therefore, it is possible to recognize also the communication traffic in the mobile network for each application.

Furthermore, according to this exemplary embodiment, the control application unit 3 calculates the total sum of the statistical information (communication traffic) in each application and determines whether or not the total sum is equal to or greater than the threshold value. If the total sum is equal to or greater than the threshold value, the control application unit 3 creates a policy for giving an instruction to use Wi-Fi with respect to the communication of an application whose communication traffic in the mobile network is the maximum and then gives the policy to the OFC 2. Therefore, with respect to the application whose communication traffic in the mobile network is the maximum, it is possible to control the application so as not to use the mobile network. As a result, the load on the mobile network can be reduced.

Moreover, in the above exemplary embodiment, the OFC 2 controls the OFS 4 according to OpenFlow. Therefore, the OFC 2 is able to widely control the operation of the OFS 4. Particularly, in this exemplary embodiment, the control application unit 3 gives a policy to the OFC 2 and the OFC 2 is able to widely control the operation of the OFS 4 according to the policy.

Furthermore, the above exemplary embodiment has been described by giving an example of using a particular mobile network (for example, LTE) as a mobile network. In this situation, it is assumed that the total sum of the communication traffic in the mobile network is equal to or greater than the threshold value and that the communication interface unit corresponding to Wi-Fi is unavailable. In this case, with respect to the communication of an application whose communication traffic in the mobile network concerned is the maximum, the OFC 2 may create a flow entry so as to perform communication by using any other mobile network (for example, 3G). For example, in the case where the action selection unit 224 instructs the flow management unit 24 to create the flow entry (step S39), it is assumed that the action selection unit 224 has already obtained information that the communication interface unit corresponding to Wi-Fi is unavailable. In this case, the action selection unit 224 has only to transmit the information "3G" to the flow management unit 24, instead of the information "Wi-Fi" and to instruct the flow management unit 24 to create the flow entry in step S39. Furthermore, the use of 3G in the case where Wi-Fi is unavailable may be previously defined in the policy that the control application unit 3 gives the OFC 2 in step S4.

Figure 10:
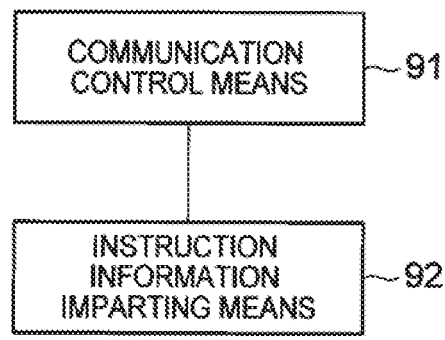
FIG. 10 is a block diagram illustrating the main part of the terminal device of the present invention.

Subsequently, the main part of the present invention will be described. FIG. 10 is a block diagram illustrating the main part of the terminal device of the present invention. The terminal device according to the present invention includes communication control means 91 and instruction information imparting means 92.

The communication control means 91 (for example, the OFC 2) controls packet transfer means (for example, the OFS 4) for transmitting a packet.

The instruction information imparting means 92 (for example, the control application unit 3) imparts instruction information (for example, a policy) representing an instruction for the communication control means 91 to the communication control means 91.

The communication control means 91 acquires statistical information including the communication traffic for each flow from the packet transfer means and retains the statistical information along with the information on application software, which is the flow transmission source, and the information on the access network used for the communication.

The instruction information imparting means 92 acquires the statistical information on each access network for each piece of application software from the communication control means 91.

With the above configuration, the terminal device is able to recognize the communication traffic in the mobile network for each piece of application software.

In the case where the total sum of the communication traffic in the mobile network is equal to or greater than the threshold value, the instruction information imparting means 92 may be configured to identify the application software whose communication traffic in the mobile network is the maximum and to impart instruction information for giving an instruction to transmit a packet where the application software is the transmission source with an access network other than the mobile network as a path to the communication control means 91.

In the case where the total sum of the communication traffic in the mobile network is equal to or greater than the threshold value, the instruction information imparting means 92 may be configured to identify the application software whose communication traffic in the mobile network is the maximum and to impart instruction information for giving an instruction to transmit a packet where the application software is the transmission source with Wi-Fi as a path to the communication control means 91.

The terminal device may be able to be connected to a plurality of access networks at the same time.

The communication control means 91 may be configured to control the packet transfer means in accordance with OpenFlow.

Although the present invention has been described with reference to the exemplary embodiment hereinabove, the present invention is not limited thereto. A variety of changes, which can be understood by those skilled in the art, may be made in the configuration and details of the present invention within the scope thereof.

This application claims priority to Japanese Patent Application No. 2013-214025 filed on Oct. 11, 2013, and the entire disclosure thereof is hereby incorporated herein by reference.

INDUSTRIAL APPLICABILITY

The present invention is suitably applied to a terminal device capable of communicating with the outside.

REFERENCE SIGNS LIST 1 terminal device
2 OFC (communication control management unit)
3 control application unit
4 OFS (Packet transfer unit)
5 protocol processing unit
6 application unit
7a to 7n communication interface unit
21 API management unit
22 policy management unit
23 statistical information management unit
24 flow management unit
25 node state management unit
26 protocol state management unit
221 policy table storage unit
222 policy entry management unit
223 policy search unit
224 action selection unit
231 statistical information accumulation management unit
232 statistical information storage unit
233 statistical information search unit

The invention claimed is:
1. A terminal device comprising:
a communication control unit implemented by a processor and which controls a packet transfer unit implemented by the processor and which transmits a packet; and
an instruction information imparting unit implemented by the processor and which imparts instruction information representing an instruction for the communication control unit to the communication control unit,
wherein the communication control unit acquires statistical information including communication traffic for each flow from the packet transfer unit and retains the statistical information along with information on application software which is a flow transmission source and information on an access network used for communication;

wherein the instruction information imparting unit acquires statistical information of each access network from the communication control unit for each piece of application software; and wherein the instruction information imparting unit identifies application software whose communication traffic in a mobile network is the maximum in the case where the total sum of the communication traffic in the mobile network is equal to or greater than a threshold value and imparts, to the communication control unit, instruction information for giving an instruction of transmitting a packet whose transmission source is the application software with an access network other than the mobile network as a path.

2. The terminal device according to claim 1, wherein the instruction information imparting unit identifies application software whose communication traffic in the mobile network is the maximum in the case where the total sum of the communication traffic in the mobile network is equal to or greater than a threshold value and imparts, to the communication control unit, instruction information for giving an instruction of transmitting a packet whose transmission source is the application software with Wi-Fi as a path.

3. The terminal device according to claim 1, wherein the terminal device is able to be connected to a plurality of access networks at the same time.

4. The terminal device according to claim 1, wherein the communication control unit controls the packet transfer unit in accordance with OpenFlow.

5. A terminal device control method, wherein:

a communication control unit, implemented by a processor, controls a packet transfer unit implemented by the processor and which transmits a packet;

an instruction information imparting unit, implemented by the processor, imparts instruction information representing an instruction for the communication control unit to the communication control unit;

the communication control unit acquires statistical information including communication traffic for each flow from the packet transfer unit and retains the statistical information along with information on application software which is a flow transmission source and information on an access network used for communication; and the instruction information imparting unit acquires statistical information of each access network from the communication control unit for each piece of application software, wherein the instruction information imparting unit identifies application software whose communication traffic in a mobile network is the maximum in the case where the total sum of the communication traffic in the mobile network is equal to or greater than a threshold value and imparts, to the communication control unit, instruction information for giving an instruction of transmitting a packet whose transmission source is the application software with an access network other than the mobile network as a path.

6. A non-transitory computer readable recording medium in which a terminal device control program is recorded, the program is installed in a computer used as a terminal device, the computer including: a communication control unit implemented by a processor and which controls a packet transfer unit implemented by the processor and which transmits a packet; and an instruction information imparting unit implemented by the processor and which imparts instruction information representing an instruction for the communication control unit to the communication control unit, the program being used for causing the computer to perform:

statistical information including communication traffic for each flow from the packet transfer unit and retains the statistical information along with information on application software which is a flow transmission source and information on an access network used for communication; and second statistical information acquisition processing in which the instruction information imparting unit acquires statistical information of each access network from the communication control unit for each piece of application software, wherein the program causing the computer to perform instruction information imparting processing in which the instruction information imparting unit identifies application software whose communication traffic in a mobile network is the maximum in the case where the total sum of the communication traffic in the mobile network is equal to or greater than a threshold value and imparts, to the communication control unit, instruction information for giving an instruction of transmitting a packet whose transmission source is the application software with an access network other than the mobile network as a path.

* * * * *